United States Patent
Yu et al.

(10) Patent No.: US 10,146,724 B2
(45) Date of Patent: Dec. 4, 2018

(54) POWER ADAPTER WITH SWITCHABLE OUTPUT VOLTAGE CONTROL

(71) Applicant: Dell Products L.P., Round Rock, TX (US)

(72) Inventors: Wei-Cheng Yu, New Taipei (TW); Tsung-Cheng Liao, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 731 days.

(21) Appl. No.: 14/586,555

(22) Filed: Dec. 30, 2014

(65) Prior Publication Data

US 2016/0187950 A1 Jun. 30, 2016

(51) Int. Cl.
  *G06F 1/00* (2006.01)
  *G06F 13/42* (2006.01)
  *G06F 1/26* (2006.01)

(52) U.S. Cl.
  CPC ........... *G06F 13/4221* (2013.01); *G06F 1/26* (2013.01); *Y02D 10/14* (2018.01); *Y02D 10/151* (2018.01)

(58) Field of Classification Search
  CPC ... G06F 13/4221; G06F 1/26; Y02B 60/1228; Y02B 60/1235
  USPC ........................................................ 713/310
  See application file for complete search history.

(56) References Cited

U.S. PATENT DOCUMENTS

| | | | |
|---|---|---|---|
| 6,668,296 B1 * | 12/2003 | Dougherty | G06F 1/1632 710/303 |
| 7,911,817 B2 | 3/2011 | Kasprzak et al. | |
| 2006/0220465 A1 * | 10/2006 | Kingsmore, Jr. | G06F 1/26 307/64 |
| 2008/0140872 A1 * | 6/2008 | Wright | G06F 13/4022 710/16 |
| 2009/0132835 A1 * | 5/2009 | Ehmann | G06F 1/3203 713/300 |
| 2010/0083023 A1 * | 4/2010 | Bjegovic | G09G 5/006 713/400 |
| 2011/0179291 A1 | 7/2011 | Weng et al. | |

* cited by examiner

*Primary Examiner* — Austin Hicks
(74) *Attorney, Agent, or Firm* — Baker Botts L.L.P.

(57) ABSTRACT

An example switchable power adapter may include power circuitry and an interface coupled to the power circuitry. An application-specific integrated circuit (ASIC) may be coupled to the power circuitry and the interface. The ASIC may be configured to receive a signal transmitted by an information handling system through the interface; determine whether a delay period within the signal satisfies a delay period condition; and cause the power circuitry to alter an output voltage level provided to the information handling system through the interface. The interface may comprise at least a Universal Serial Bus (USB) receptacle.

20 Claims, 3 Drawing Sheets

POWER ADAPTER WITH SWITCHABLE OUTPUT VOLTAGE CONTROL

TECHNICAL FIELD

The present disclosure relates generally to the operation of computer systems and information handling systems, and, more particularly, a power adapter with switchable output voltage control.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The mechanisms through which power is supplied to information handling systems have become increasingly important with the advent of tablet computers and other portable information handling systems. The portability of power supplies and power adapters for the tablet computers and other portable information handling systems is important, as is the flexibility of the power supplies and power adapters to supply the necessary power levels to the devices. Additionally, power supplies and power adapters increasingly utilize standard connections, such as Universal Serial Bus (USB), to allow for interchangeability with other devices.

SUMMARY

In accordance with the present disclosure, a power adapter with switchable output voltage control is described. In one aspect, the power adapter may comprise power circuitry and an interface coupled to the power circuitry. An application-specific integrated circuit (ASIC) may be coupled to the power circuitry and the interface. The ASIC may be configured to receive a signal transmitted by an information handling system through the interface; determine whether a delay period within the signal satisfies a delay period condition; and cause the power circuitry to alter an output voltage level provided to the information handling system through the interface. The interface may comprise at least a Universal Serial Bus (USB) receptacle.

The power adapter with switchable output voltage control disclosed herein is technically advantageous because it uses a small component with reduced complexity compared to existing USB Power Delivery System. This may increase the portability of the power adapter and its reduce its cost, which still providing interchangeable coupling to different types of information handling systems using standard USB connectors. Other advantages would be appreciated by one of ordinary skill in the art in view of this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
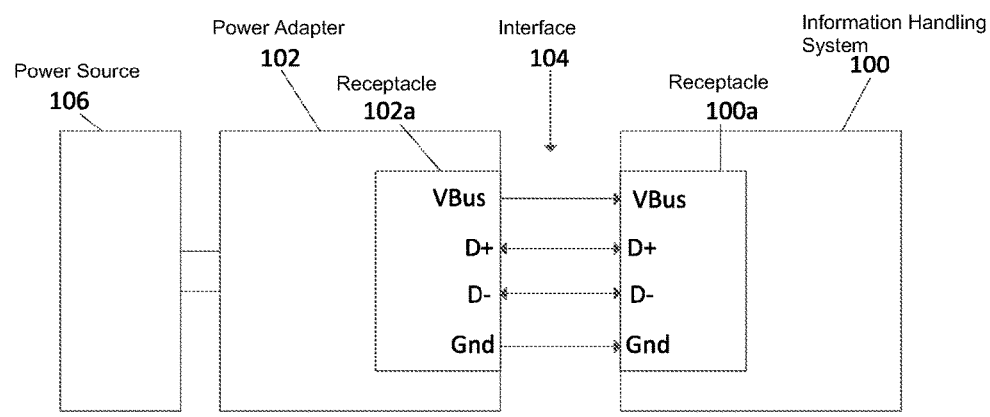
FIG. 1 is a diagram of an information handling system coupled to a power adapter through an interface, according to aspects of the present disclosure.

Shown in FIG. 1 is a diagram of an information handling system 100 coupled to a power adapter 102 through an interface 104, according to aspects of the present disclosure. The information handling system 100 may comprise a portable information handling system such as a tablet computer or a smartphone. The power adapter 102 may be coupled to a power source 106, such as an alternating current (AC) residential power grid, and may supply direct current (DC) power at pre-determined voltage and current levels to the information handling system 100 through the interface 104. The information handling system 100 may communicate with the power adapter 102 through the interface 104 in addition to receiving DC power.

In the embodiment shown, the interface 104 comprises a USB cable coupled between two USB receptacles 100a and 102a of the information handling system 100 and power adapter 102, respectively. The receptacles 100a/102a may comprise any receptacle-type defined by the USB standard, including, but not limited to, Micro-A, Micro-B, Standard-A, and Standard-B receptacles. Each of the receptacles 100a/102a comprise four pins—$V_{Bus}$, D+, D−, and GND— coupled to the corresponding pin in the other one of the receptacles 100a/102a by a separate wire within the cable 104. Power may be supplied to information handling system 100 from the power adapter 102 through the $V_{Bus}$ pins and corresponding $V_{Bus}$ wire in the cable 104, and the GND pins may provide a common ground between the information handling system 100 and the power adapter 102. The D+ and D− pins along with corresponding D+ and D− wires in the cable 104 may function to provide bi-directional data communications channels between the information handling system 100 and the power adapter 102.

Accordingly to aspects of the present disclosure, the power adapter 102 may comprise a switchable power adapter that is operable to switch the voltage level it supplies to the information handling system 100 through the interface 104 based, at least in part, on a handshake signal transmitted by the information handling system 100 to the power adapter 102 through the cable 104. In the embodiment shown, the power adapter 102 may switch the voltage supplied to the information handling system 100 through the $V_{Bus}$ pins from a first pre-determined voltage level to a second pre-determined voltage level. Generally, the second pre-determined voltage level is higher than the first pre-determined voltage level and the power adapter only provides the higher voltage level once it verifies through the handshake signal that the information handling system 100 is rated to receive the higher voltage level. The voltage levels may be pre-determined to provide voltages commonly used with the type of information handling system to be connected to the power adapter 102. Example voltages for tablets and other portable information handling systems include 5 volts (V) and 19.5 V, but other voltages are possible.

The handshake signal may be transmitted from the information handling system 100 to the power adapter 102 over one or both of the D+ pins and D+ wire, and the D− pins and D− wire. Although many different types of handshake signals are possible, including complex communications that specifically identify the devices, a simple handshake signal is preferable. One example handshake signal, described in detail below, comprises the transmission of a voltage signal with a rising and falling edge separated by a delay. The rising and falling edges correspond to transitions in the signal between high and low voltage levels. This simplified signal reduces the complexity of the electronics needed to transmit and receive the signal, and therefore reduces the cost of information handling system 100 and the power adapter 102. For example, instead of two general integrated circuits, one within the power adapter 102 and the other within the information handling system 100, programmed to communicate through the interface 104 using a standard communications protocol, as is typical with the USB Power Delivery standard, a single application-specific integrated circuit (ASIC) may be located in the power adapter 102 to receive the handshake signal from one or more general processors or controllers within the information handling system 100.

Figure 2:
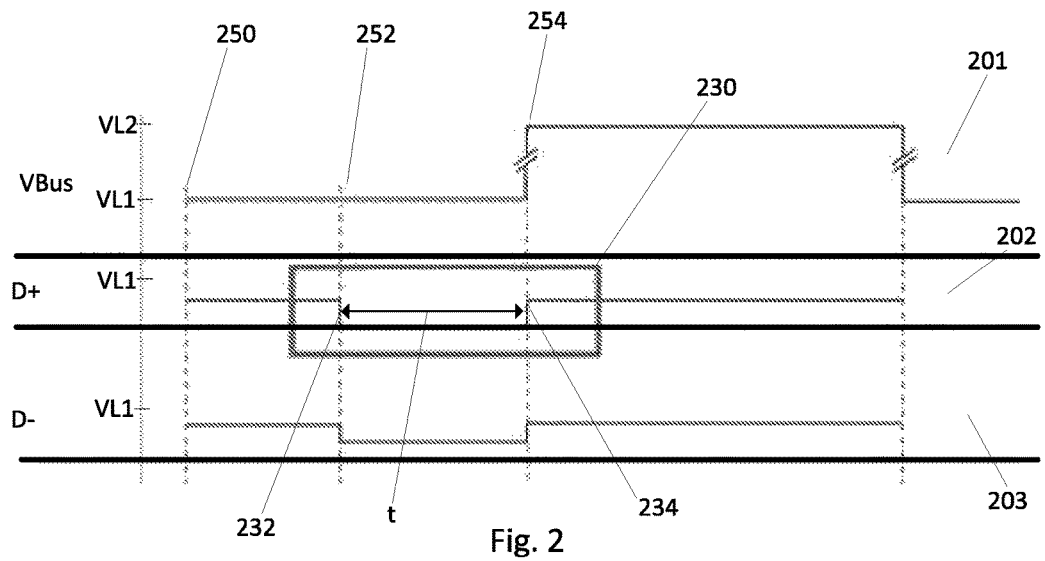
FIG. 2 is a signal diagram illustrating an example handshaking process, according to aspects of the present disclosure.

FIG. 2 is a signal diagram illustrating voltage levels over time across the USB cable 104 during an example handshake process between the power adapter 102 and the information handling system 100 from FIG. 1, according to aspects of the present disclosure. The signal 201 comprises the voltage supplied by the power adapter 102 to the information handling system 100 through the $V_{Bus}$, pins; signal 202 comprises a signal transmitted by the information handling system 100 to the power adapter 102 through the D+ pins; and signal 203 comprises a signal transmitted by the information handling system 100 to the power adapter 102 through the D− pins. The voltage across the GND pins is generally constant and is not shown to the sake of simplicity.

Line 250 may correspond to a time in which the information handling system 100 and power adapter 102 are first coupled together by the cable 104. At that point, the power adapter 102 may supply power to the information handling system 100 at a first voltage level VL1. This initial supplied voltage may be sufficient to power the processor or other circuitry within the information handling system 104. That circuitry may, in turn, cause the information handling system 100 to transmit non-zero voltage signals over the D+ and D− pins to indicate that the information handling system 100 has been appropriately connect to and is receiving voltage from the power adapter 102.

At line 252, the information handling system 104 may begin transmitting a handshake signal 230 to the power adapter 102. In the embodiment shown, the handshake signal 230 begins with the information handling system 100 grounding or otherwise transmitting low or zero voltage across the D+ pins, causing a falling edge 232 of the handshake signal 230 that is sensed by the power adapter 102. At line 252, the information handling system 104 may also reduce the voltage level across the D− pins to reduce power consumption and use. The information handling system 100 may maintain the low or zero voltage for a time t, at which point the information handling system 100 may increase the voltage on the D+ pins to a high or non-zero level, causing a rising edge 234 of the handshake signal 230 that is sensed by the power adapter 102. Once the rising edge 234 is sensed, the power adapter 102 may determine whether the delay period t between the falling edge 232 and the rising edge 234 of the handshake signal 230 is above a predetermined delay period threshold. If so, the power adapter 102 may increase its supply voltage to a second voltage level VL2, as can be seen at line 254. If not, the power adapter 102 may continue supplying voltage at VL1.

The characteristics and specific configuration of the handshake signal 230 are not intended to be limiting. Rather, other arrangements of rising and falling edges and delay times are possible, as are sequences of rising and falling edges and delay times. Preferably, the handshake signal will be as simple as possible to reduce the circuitry complexity needed to transmit the handshake signal from the information handling system 100 and receive the handshake signal at the power adapter 102. Additionally, although the handshake signal 230 is transmitted through the D+ pins in the current embodiments, some or all of the handshake signal 230 may be transmitted through the D− pins of the interface 104.

Figure 3:
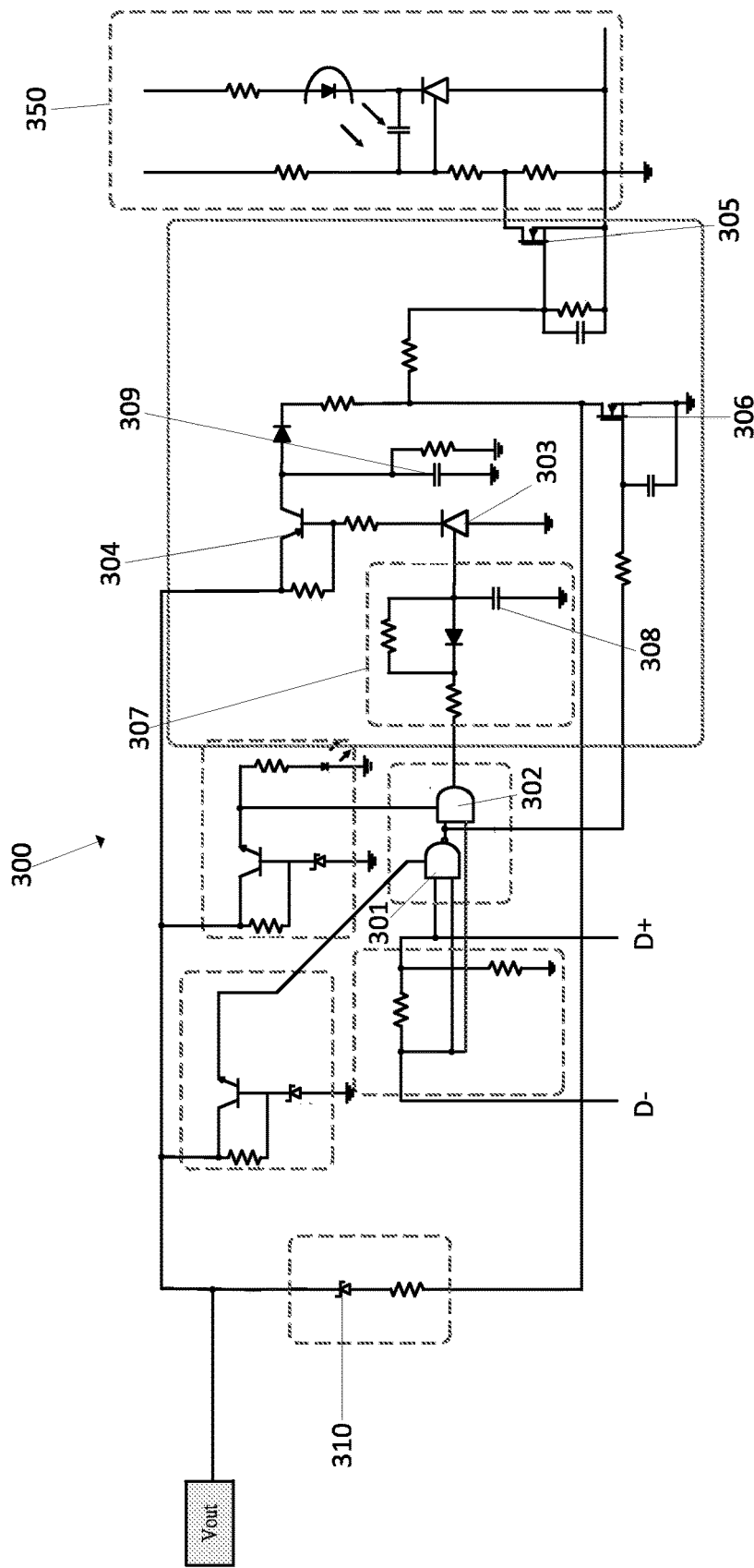
FIG. 3 is a diagram of an existing switchable power adapter with discrete circuit.

FIG. 3 is a diagram of an existing switchable power adapter with a discrete circuit 300 specifically designed to detect the handshake signal illustrated in FIG. 2. In the embodiment shown, the D+ and D− pins may be coupled as inputs to a NAND gate 301, whose output Y1 may be coupled as an input to an AND gate 302, along with the D− pin. The NAND gate 301 may recognize high or non-zero voltage levels on the D+ and D− pins as a logical "true" and low or zero voltage levels as a logical "false." The AND gate 302 may recognize high or non-zero voltage levels on the D− pin and output Y1 as a logical "true" and low or zero voltage levels as a logical "false." The NAND gate 301 and AND gate 302 may logically cooperate such that the output Y2 of the AND gate 302 comprises a logical "true" or non-zero voltage only when the D+ pin is at a zero voltage and the D− pin is at a non-zero voltage, as it is during the handshake signal 230 illustrated in FIG. 2.

When the discrete circuit 300 is initially coupled to an information handling system, such as during the time between lines 250 and 252 in FIG. 2, both the D+ and D− pins are set to non-zero voltages, such that the outputs Y1 and Y2 of the logical gates are both set to logical "false" or zero voltage values. The zero voltage value at the output Y2 will prevent the translinear circuit element 303 from conducting current, which prevents voltages from being applied to the base of transistor 304 and the gate of transistor 305 and, therefore, causes them to similarly not conduct current. Likewise, a zero voltage value at the output Y1 will prevent the transistor 306 from conducting current, due to the coupling between the output Y1 and the gate of the transistor 306.

When the voltage on the D+ pin is reduced to a low or zero voltage value and the voltage on the D− pin remains high or non-zero, such as at the falling edge 232 of the handshake signal 230 in FIG. 2, the outputs Y1 and Y2 are set to logical "true" or non-zero voltage values. The output Y2 may be coupled to an RC charging circuit 307 that may comprise a charging time set to the delay period threshold by selection of the resistor and capacitor values. Specifically, the resistor and capacitor values may be selected such that it takes a time $t_{charge}$ for the capacitor 308 to gain sufficient charge to turn on the translinear circuit element 303, which in turn causes a voltage to be applied to the base of the transistor 304 and for the transistor 304 to conduct current. The transistor 306 will also conduct based on the non-zero voltage applied to the gate of the transistor 306 by the output Y1. Thus, after the time $t_{charge}$ current will be conducted through the transistors 304 and 306, charging the capacitor 309 while the transistor 305 is turned off. If the D+ pin is not kept at a low or zero voltage value for at least time t, the transistor 304 will not conduct and the capacitor 309 will not charge.

When the voltage on the D+ pin is increased to a high or non-zero voltage value and the voltage on the D− pin remains non-zero, such as at the rising edge 234 of the handshake signal 230 in FIG. 2, the outputs Y1 and Y2 are set to logical "false" or low/zero voltage values. This will cause the translinear circuit element 303, transistor 304, and transistor 306 to stop conducting current. The charged current within the capacitor 309, however, will discharge, causing the transistor 305 to turn on, and the resistance of a feedback circuit 350 of the power adapter will change by the conductance of the transistor 305. This change in the resistance of the feedback circuit 350 will cause the power adapter to output power at a higher voltage level. The higher voltage level surpasses the feedback voltage of the zener diode 310, causing the diode 310 to conduct and supply sufficient current to maintain conductance at the transistor 305, which causes the power adapter to continue supplying voltage at the higher voltage level. Because the capacitor 309 only charges if the transistor 304 conducts current, the transistor 304 only conducts current if the capacitor 308 is sufficiently charged to cause the translinear circuit element 303 to conduct current, and the capacitor 308 is only charged if the voltage level on the D+ pin is low or zero for longer than time $t_{charge}$, time $t_{charge}$ may comprise the delay period threshold.

As mention above, the discrete circuit above is specifically designed for the handshake signal illustrated in FIG. 2. As such, it would not function to recognize other types of handshake signals with differently oriented rising and falling edges. Additionally, there are size considerations when implementing discrete circuits in power adapters for portable information handling systems. According to aspects of the present disclosure, certain functionality of the discrete circuit shown above may be implemented into an ASIC. This may reduce the corresponding size, component number, and cost of a power adapter incorporating the ASIC as compared to the discrete circuit components. Moreover, the functionality may be generalized to allow for the use of different, simplified rising and falling edge handshake signals to be implemented without constraint by the combination of discrete components described above.

Figure 4:
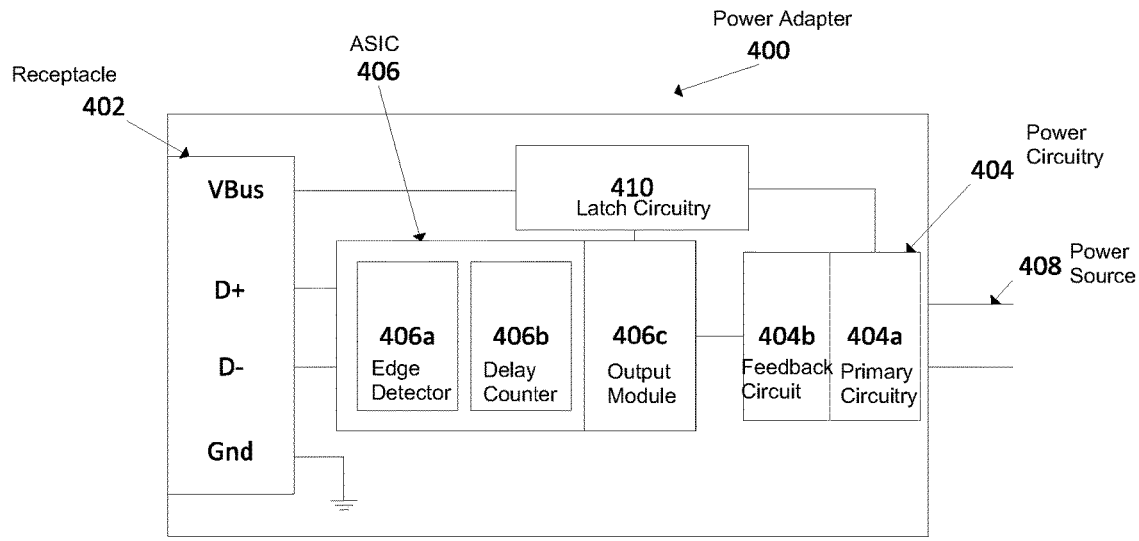
FIG. 4 is a block diagram of a switchable power adapter with an ASIC, according to aspects of the present disclosure.

FIG. 4 is a block diagram of a switchable power adapter with an ASIC, according to aspects of the present disclosure. In the embodiment shown, the power adapter 400 comprises a USB receptacle 402, power circuitry 404, and an ASIC 406 coupled to the USB receptacle 402 and the power circuitry 404. The USB receptacle 402 may comprise $V_{Bus}$, D+, D−, and GND pins, as described above. The power circuitry 404 may comprise primary circuitry 404a that includes a transformer/rectification circuit to step down and convert to DC the AC power provided via power source 408, and a feedback circuit 404b similar to the feedback circuit described above with reference to FIG. 3. The power circuitry 304 may be coupled to the $V_{Bus}$ pin of the USB receptacle 402.

In the embodiment shown, the ASIC 406 is coupled to D+ and D− pins of the USB receptacle 402, and to the feedback circuitry 404a of the power circuitry 404. The ASIC 406 may comprise an edge detector 406a that receives the voltage signals from an attached information handling system (not shown) through the D+ and D− pins. The edge detector 406a may function to identify one or more rising and falling edges of the handshake signal to determine the beginning and end of a delay period of the handshake signal, similar to the function of the logical gates described with reference to FIG. 3. This may include identifying a delay period than begins and ends respectively with the falling and rising edge of a voltage signal, such as the handshake signal illustrated in FIG. 2, or a delay period that begins and ends with some other combination of falling edges and rising edges.

The edge detector 406a may indicate to a delay counter 406b of the ASIC 400 the beginning and end of a delay period of the handshake signal. For example, the edge detector 406 may set a flag or generate a logical "true" signal that is received by the delay counter 406b when the delay period is occurring. The delay counter 406 may receive the delay period indication from the edge detector 406 and determine whether the delay period indicated by edge detector 406a surpasses a pre-determined delay period threshold or otherwise meets the delay conditions required of the handshake signal, similar to the function of the RC charging circuit 307 described with reference to FIG. 3. The delay counter 406 may allow for a broader variety handshake signals than are available in the RC charging circuit, including handshake signals with multiple rising and falling edges defining a series of delay periods of a pre-determined length.

The delay counter 406 may signal an output module 406c whether the delay period conditions have been satisfied. If the delay period conditions have been satisfied, the output module 406c may output a signal to the feed back circuitry 404b to cause the primary circuitry 404a to output the higher voltage level through the $V_{Bus}$ pin. In certain embodiments, the output signal may comprise a voltage signal that drives a transistor to alter the resistance of the feedback circuit, similar to the transistor 305 if FIG. 3. When the voltage level output by the primary circuitry 404a reaches the second voltage level, the latch circuitry 410 may be triggered to maintain the second voltage level from the primary circuitry 404a. The latch circuitry 410 may include a zener diode configured similarly to the zener diode 310 described above.

Figure 5:
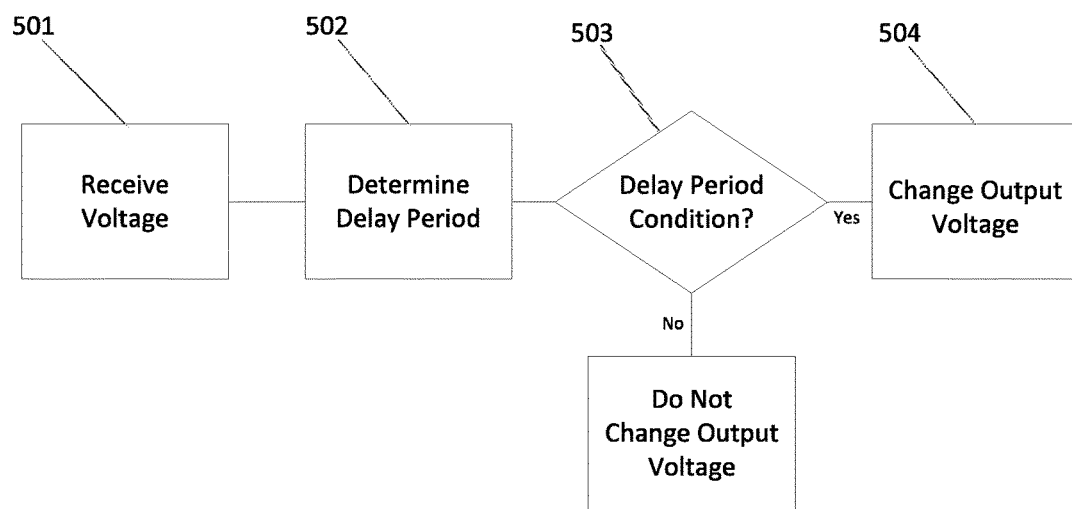
FIG. 5 is a flow diagram of an example method, according to aspects of the present disclosure.

FIG. 5 is a flow diagram of an example method, according to aspects of the present disclosure. At step 501, a switchable power adapter may receive at an ASIC a signal sent by an information handling system to the switchable power adapter through an interface. Step 502 may comprise determining a least one delay period within the signal. Step 503 may comprise determining whether the delay period satisfies a delay period condition, such as the duration of the delay period. If the delay period condition is met, the ASIC may cause the output voltage supplied by the switchable power supply to the information handling system through the interface to switch from a first level to a second level at step 504. If the delay period condition is not met, then output voltage supplied by the switchable power supply to the information handling system may not change at step 505.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:
   providing power at a first voltage level to an information handling system through a Universal Serial Bus (USB) interface, wherein the information handling system communicates through the interface using a communications protocol;
   receiving at an application specific integrated controller (ASIC) a handshake signal transmitted by the information handling system through the interface;
   determining at the ASIC whether a delay period within the signal satisfies a delay period condition, wherein the determination comprises:
      identifying at an edge detector of the ASIC one or more rising and falling edges of the handshake signal to determine a beginning and an end of the delay period;
      indicating to a delay counter of the ASIC the beginning and the end of the delay period; and
      determining, by the delay counter, whether the delay period indicated by the edge detector meets the delay period condition;

signaling, by the delay counter, to an output module based on the determination of whether the delay period indicated by the edge detector meets the delay period condition;

outputting, by the output module, a signal to a feedback circuit; and providing power at a second voltage level through the interface if the delay period within the signal satisfies a delay period condition based on the feedback circuit causing a primary circuitry to output the second voltage level.

2. The method of claim 1, wherein receiving at the application specific integrated controller (ASIC) the signal transmitted by the information handling system through the interface comprises receiving at the ASIC a voltage signal with at least one falling edge and at least one rising edge.

3. The method of claim 2, wherein the at least one falling edge comprises a transition between a non-zero voltage and a zero voltage, and the at least one falling edge comprises a transition between the zero voltage and the non-zero voltage.

4. The method of claim 2, wherein determining at the ASIC whether the delay period within the signal satisfies the delay period condition comprises
identifying the at least one falling edge;
identifying the at least one rising edge; and
determining the delay period between the identified falling edge and the identified rising edge.

5. The method of claim 4, wherein determining at the ASIC whether the delay period within the signal satisfies the delay period condition comprises determining whether the delay period is longer than a delay period threshold.

6. The method of claim 1, wherein providing power at the second voltage level through the interface if the delay period within the signal satisfies the delay period condition comprises altering with the ASIC a feedback circuit of power circuitry coupled to the ASIC.

7. The method of claim 1, wherein the interface comprises at least a Universal Serial Bus (USB) cable.

8. The method of claim 7, wherein providing power at the first voltage level to the information handling system through the interface comprises providing power at a first voltage level to an information handling system through a $V_{Bus}$ wire of the USB cable.

9. The method of claim 8, wherein receiving at the ASIC the signal transmitted by the information handling system through the interface comprises receiving at the ASIC the signal transmitted by the information handling system through at least one of a D+ and a D− wire of the USB cable.

10. The method of claim 1, wherein the second voltage level is higher than the first voltage level.

11. An apparatus, comprising:
power circuitry;
a Universal Serial Bus interface coupled to the power circuitry, wherein an information handling system communicates through the interface using a communications protocol; and
an application-specific integrated circuit (ASIC) coupled to the power circuitry and the interface, the ASIC configured to receive a signal transmitted by an information handling system through the interface;
determine whether a delay period within the signal satisfies a delay period condition, wherein the determination comprises:
identifying at an edge detector of the ASIC one or more rising and falling edges of the handshake signal to determine a beginning and an end of the delay period;
indicating to a delay counter of the ASIC the beginning and the end of the delay period; and
determining, by the delay counter, whether the delay period indicated by the edge detector meets the delay period condition;
signaling, by the delay counter, to an output module based on the determination of whether the delay period indicated by the edge detector meets the delay period condition;
outputting, by the output module, a signal to a feedback circuit; and
cause the power circuitry to alter an output voltage level provided to the information handling system through the interface based on the feedback circuit causing a primary circuitry to output the second voltage level.

12. The apparatus of claim 11, wherein the signal comprises a voltage signal with at least one falling edge and at least one rising edge.

13. The apparatus of claim 12, wherein the at least one falling edge comprises a transition between a non-zero voltage and a zero voltage, and the at least one falling edge comprises a transition between the zero voltage and the non-zero voltage.

14. The apparatus of claim 12, wherein the ASIC is further configured to
identify the at least one falling edge;
identify the at least one rising edge; and
determine the delay period between the identified falling edge and the identified rising edge.

15. The apparatus of claim 14, wherein the delay period comprises a delay period threshold.

16. The apparatus of claim 11, wherein the ASIC is further configured to cause the power circuitry to alter an output voltage level provided through the interface by altering a feedback circuit of the power circuitry.

17. The apparatus of claim 11, wherein the interface comprises at least a Universal Serial Bus (USB) cable.

18. The apparatus of claim 17, wherein the power circuitry provides the output voltage to the information handling system power through a $V_{Bus}$ wire of the USB cable.

19. The apparatus of claim 18, wherein the ASIC is further configured to receive the signal transmitted by the information handling system through the interface by receiving the signal transmitted by the information handling system through at least one of a D+ and a D− wire of the USB cable.

20. The apparatus of claim 11, wherein the altered output voltage level is higher than an original output voltage level.

* * * * *